US011202027B2

(12) United States Patent
Kim (10) Patent No.: US 11,202,027 B2
(45) Date of Patent: Dec. 14, 2021

(54) ANALOG-TO-DIGITAL CONVERSION (ADC) CIRCUIT AND CMOS IMAGE SENSOR INCLUDING THE SAME

(71) Applicant: SK hynix Inc., Icheon-si (KR)

(72) Inventor: Tae Gyu Kim, Namyangju-si (KR)

(73) Assignee: SK hynix Inc., Icheon-si (KR)

( * ) Notice: Subject to any disclaimer, the term of this patent is extended or adjusted under 35 U.S.C. 154(b) by 68 days.

(21) Appl. No.: 16/218,861

(22) Filed: Dec. 13, 2018

(65) Prior Publication Data

US 2020/0099879 A1    Mar. 26, 2020

(30) Foreign Application Priority Data

Sep. 21, 2018   (KR) .................. 10-2018-0113590

(51) Int. Cl.
*H04N 5/378* (2011.01)
*H04N 5/3745* (2011.01)
*H04N 5/357* (2011.01)

(52) U.S. Cl.
CPC ........... *H04N 5/378* (2013.01); *H04N 5/3575* (2013.01); *H04N 5/37455* (2013.01)

(58) Field of Classification Search
CPC ... H04N 5/378; H04N 5/3575; H04N 5/37455
USPC ....................................................... 348/241
See application file for complete search history.

(56) References Cited

U.S. PATENT DOCUMENTS

| 6,344,877 | B1 | 2/2002 | Gowda et al. |
| 9,204,143 | B2 | 12/2015 | Wang et al. |
| 9,438,830 | B2 | 9/2016 | Kim et al. |
| 2014/0340552 | A1 | 11/2014 | Wuen et al. |
| 2015/0036035 | A1 | 2/2015 | Wang et al. |
| 2016/0006957 | A1 | 1/2016 | Park et al. |
| 2016/0028981 | A1 | 1/2016 | Lee et al. |
| 2016/0261814 | A1* | 9/2016 | Ueda ................. H04N 5/232122 |
| 2016/0301891 | A1* | 10/2016 | Kim ..................... H04N 5/3658 |
| 2019/0068906 | A1* | 2/2019 | Kobayashi ............. H04N 5/357 |

FOREIGN PATENT DOCUMENTS

| CN | 1866748 A | 11/2006 |
| CN | 104954706 A | 9/2015 |
| CN | 108293100 A | 7/2018 |
| CN | 108337455 A | 7/2018 |

* cited by examiner

*Primary Examiner* — Antoinette T Spinks
(74) *Attorney, Agent, or Firm* — Perkins Coie LLP (57) ABSTRACT

An analog-to-digital conversion (ADC) circuit and a CMOS image sensor are disclosed. The ADC circuit includes a first column line configured to receive a first pixel signal from a first pixel, a second column line configured to receive a second pixel signal from a second pixel located adjacent to the first pixel, and a correlated double sampling (CDS) circuit configured to perform a CDS operation by comparing the first pixel signal, the second pixel signal, a first ramp signal, and a second ramp signal with one another. The CDS circuit may perform the CDS operation on the first pixel signal by selecting the first column line in a first operation period, and may perform the CDS operation on the first pixel signal and the second pixel signal by selecting the first column line and the second column line in a second operation period.

10 Claims, 7 Drawing Sheets

ANALOG-TO-DIGITAL CONVERSION (ADC) CIRCUIT AND CMOS IMAGE SENSOR INCLUDING THE SAME

CROSS-REFERENCE TO RELATED APPLICATION

This patent document claims the priority and benefits to Korean patent application No. 10-2018-0113590, filed on Sep. 21, 2018, which is hereby incorporated in its entirety by reference herein.

TECHNICAL FIELD

The technology and implements disclosed in this patent document relate to an analog-to-digital conversion (ADC) circuit and a CMOS image sensor (CIS) including the same.

BACKGROUND

A Complementary Metal Oxide Semiconductor (CMOS) Image Sensor (CIS) implemented by a CMOS process has been developed to have lower power consumption, lower costs, and smaller sizes than other competitive products. Thus, CMOS image sensors (CISs) have been intensively researched and rapidly come into widespread use. Specifically, CMOS image sensors (CISs) have been developed to have higher image quality than other competitive products, such that the application scope of CMOS image sensors (CISs) has recently been extended to video applications that require higher resolution and higher frame rate as compared to competitive products.

SUMMARY

Various embodiments of the disclosed technology are directed to providing an analog-to-digital conversion (ADC) circuit and a CMOS image sensor including the same that substantially obviate one or more problems due to limitations and disadvantages of the related art.

The embodiments of the disclosed technology relate to an analog-to-digital conversion (ADC) circuit and a CMOS image sensor which are designed to simultaneously drive one pair of two pixels adjacent to each other using different row drivers so as to remove and cancel noise signals received from the two pixels.

In an embodiment of the disclosed technology, an analog-to-digital conversion (ADC) circuit includes a first column line configured to receive a first pixel signal from a first pixel, the first pixel signal generated in response to light incident upon the first pixel, a second column line configured to receive a second pixel signal from a second pixel located adjacent to the first pixel, the second pixel signal generated in response to light incident upon the second pixel and a correlated double sampling (CDS) circuit configured to perform a correlated double sampling (CDS) operation by comparing the first pixel signal, the second pixel signal, a first ramp signal, and a second ramp signal with one another. The correlated double sampling (CDS) circuit may perform the correlated double sampling (CDS) operation on the first pixel signal by selecting the first column line in a first operation period, and may perform the correlated double sampling (CDS) operation on the first pixel signal and the second pixel signal by selecting the first column line and the second column line in a second operation period.

In another embodiment of the disclosed technology, a complementary metal oxide semiconductor (CMOS) image sensor includes a first pixel configured to output a first pixel signal through a first column line, a second pixel located adjacent to the first pixel, configured to output a second pixel signal through a second column line, and an analog-to-digital conversion (ADC) circuit configured to perform a correlated double sampling (CDS) operation by comparing the first pixel signal, the second pixel signal, a first ramp signal, and a second ramp signal with one another, count one or more sampling signals, and output the counted resultant signal as a digital signal. The first pixel may be activated in a first operation period. The first pixel and the second pixel may be activated in a second operation period, such that the correlated double sampling (CDS) operation is carried out.

In another embodiment of the disclosed technology, a complementary metal oxide semiconductor (CMOS) image sensor includes a pixel array provided with a plurality of pixels arranged in row and column directions, and configured to output a plurality of pixel signals corresponding to incident light, a row decoding circuit configured to generate a drive signal for driving the pixel array, a ramp generator configured to generate a single pair of ramp signals, and an analog-to-digital conversion (ADC) circuit configured to convert the plurality of pixel signals into digital signals in response to the single pair of ramp signals. The row decoding circuit selects any one of the plurality of pixels in a first operation period, and selects one pair of pixels adjacent to each other from among the plurality of pixels in a second operation period.

In another embodiment of the disclosed technology, an analog-to-digital conversion (ADC) circuit includes a first column line configured to receive a first pixel signal from a first pixel, a second column line configured to receive a second pixel signal from a second pixel located adjacent to the first pixel, and a correlated double sampling (CDS) circuit configured to perform a correlated double sampling (CDS) operation by comparing the first pixel signal, the second pixel signal, a first ramp signal, and a second ramp signal with one another. The correlated double sampling (CDS) circuit may perform the correlated double sampling (CDS) operation on the first pixel signal by selecting the first column line in a first operation period, and may perform the correlated double sampling (CDS) operation on the first pixel signal and the second pixel signal by selecting the first column line and the second column line in a second operation period.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other features and advantages of the disclosed technology will become readily apparent by reference to the following detailed description when considered in conjunction with the accompanying drawings wherein.

DETAILED DESCRIPTION

CMOS image sensors have been developed to provide higher resolution and/or higher frame rate. Higher-resolution CMOS image sensors (CISs) have smaller pixels (i.e., smaller-sized unit pixels) and larger pixel arrays, such that analog-to-digital converters (ADCs) interposed between columns are located closer to each other. In addition, the number of switching operations occurring in each pixel and the amount of data to be processed have been increased. As a result, the amount of noise has also increased, which causes undesired occurrence in the overall data conversion process.

In order to address the above issues, technologies for removing (or cancelling) noises have been suggested. One of the currently available technology suggests removing noises by interacting pixel noises with ramp signals. However, pixel noises generated in a pixel array is slightly different in phase and size from noises copied by a ramp generator. This is because noises generated by the conversion of pixel data may include not only pixel noises but also various other kinds of noise. If the power becomes unstable or temperature changes are sufficiently large, other kinds of noises become to increase and thus it becomes more difficult to remove or cancel noises in the CMOS image sensors. Upon recognition of the limitations on the currently available noise removing techniques, some implementations of the disclosed technology provide techniques to efficiently reduce noises for CMOS image sensors.

Figure 1:
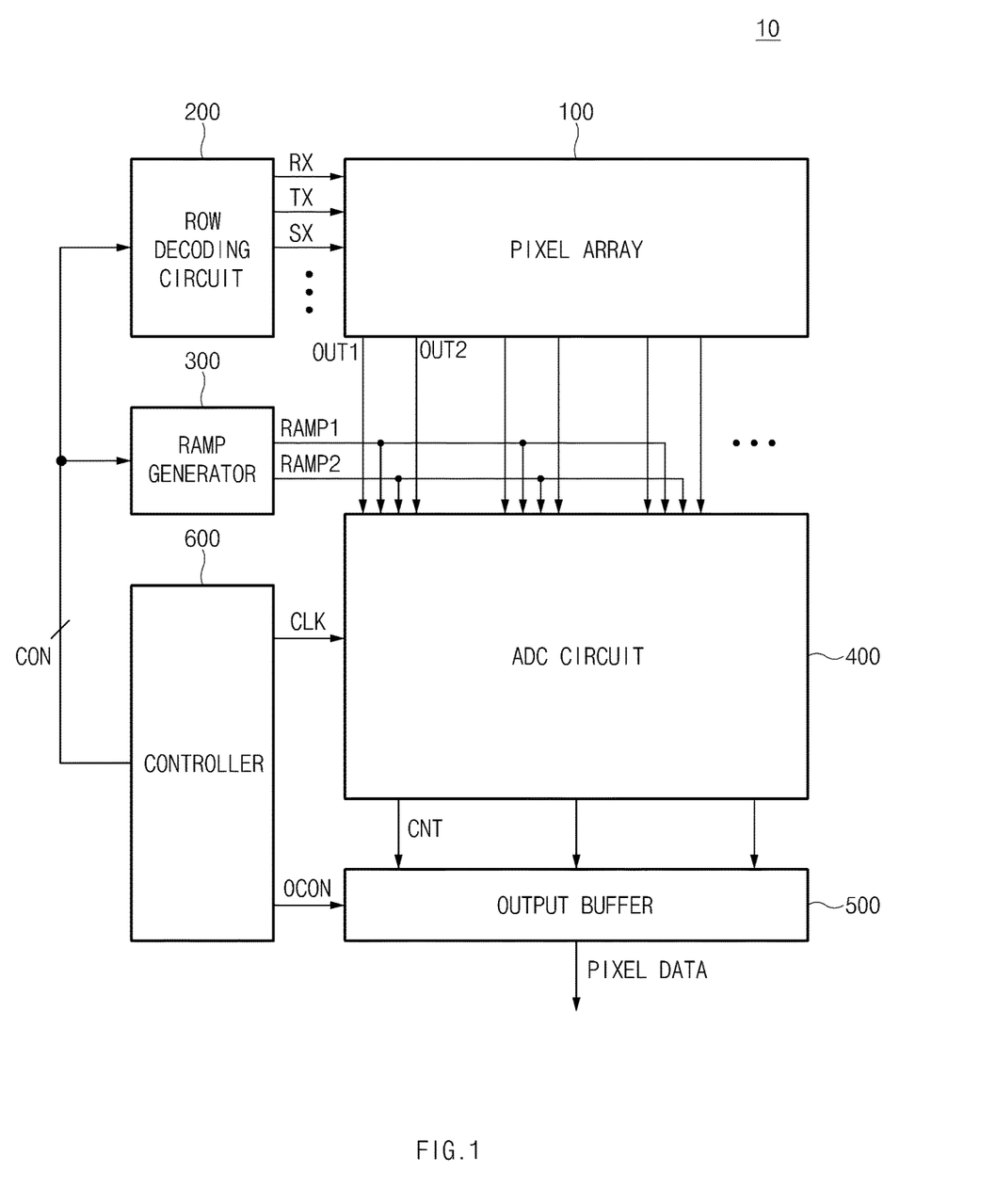
FIG. 1 is a schematic diagram illustrating a representation of an example of a CMOS image sensor provided with an ADC circuit according to an embodiment of the disclosed technology.

FIG. 1 is a schematic diagram illustrating a CMOS image sensor 10 provided with an ADC circuit according to an embodiment of the disclosed technology.

Referring to FIG. 1, the CMOS image sensor 10 may include a pixel array, a row decoding circuit 200, a ramp generator 300, an analog-to-digital conversion (ADC) circuit 400, an output buffer 500, and a controller 600.

The pixel array 100 may include pixels arranged in rows and columns to acquire image data. Each pixel including a photoelectric conversion element to convert an incident optical signal into an electrical signal. For example, the photoelectric conversion element may include a photodiode, a phototransistor, a photogate, or a pinned photodiode. The pixel array 100 may output pixel signals, for example, OUT1 and OUT2, to the ADC circuit 400. Control circuitry or controller 600 is provided as part of the circuitry coupled to the pixel array to control operational characteristic of image pixel array 100. In some implementations, the pixel array 100 may operate by drive signals (such as a reset signal RX, a transmission signal TX, and a selection signal SX) received from the row decoding circuit 200.

Upon receiving a control signal CON from the controller 600, the row decoding circuit 200 may select pixels of the pixel array 100 arranged on one or more corresponding row line to control the selected pixels.

Some implementations of the disclosed technology suggest operating the CMOS image censor 100 in two different periods including a first operation period and a second operation period. For example, in the first operation period (to be described later), the row decoding circuit 200 may generate a selection signal SC to select any one of row lines. In the second operation period (to be described later) following the first operation period, the row decoding circuit 200 may generate a selection signal SC to select two adjacent row lines (i.e., the row line selected in the first operation period and its adjacent row line). In some implementations as further described in connection with FIG. 7, the row decoding circuit 200 may further activate the reset signal RX and the transmission signal TX during each of the first and second operation periods.

Some implementations of the disclosed technology suggest activating a pixel during the first operation period and simultaneously activating one pair of two adjacent pixels during the second operation period. The pair of the two adjacent pixels activated during the second operation period may include the pixel activated during the first operation and its adjacent pixel. By simultaneously activating the pair of pixels during the second operation period, the two adjacent pixels, which have same structures and simultaneously activated, can have same noise components under the same conditions (for example, a same reset signal RX, a same transmission signal TX, and a same selection signal SX). For example, pixel signals OUT1 and OUT2 transferred from one pair of pixels to the ADC circuit 400 during the second operation period can have the same noise components. Therefore, in a comparison operation mode of the ADC circuit 400, noise signals received from two pixels (for example, OUT1 and OUT2) are offset against each other, resulting in cancellation of source noise.

As shown in FIG. 1, upon receiving the control signal CON from the controller 600, the ramp generator 300 may generate ramp signals RAMP1 and RAMP2, and may output the generated ramp signals RAMP1 and RAMP2 to the ADC circuit 400. In accordance with one embodiment of the disclosed technology, the ramp generator 300 may generate one pair of ramp signals RAMP1 and RAMP2.

The ADC circuit 400 may convert analog pixel signals OUT1 and OUT2 generated from the pixel array 100 into digital signals. The ADC circuit 400 may compare pixel signals OUT1 and OUT2 generated from the pixel array 100 with ramp signals RAMP1 and RAMP2 received from the ramp signal generator 300. In response to the comparison between the pixel signals OUT1 and OUT2 and the ramp signals RAMP1 and RAMP2, the ADC circuit 400 may output a column-based counting signal CNT by counting a clock signal CLK received from the controller 600.

The output buffer 500 may latch or hold the counting signal CNT received from the ADC circuit 400. The output buffer 500 may latch or hold counting information, and may sequentially output pixel data in response to an output control signal OCON.

The controller 600 may control the row decoding circuit 200, the ramp generator 300, the ADC circuit 400, and the output buffer 500. The controller 600 may include a timing generator. The controller 600 may control the overall procedure needed to output image data sensed by the image sensor according to lapse of time.

Figure 2:
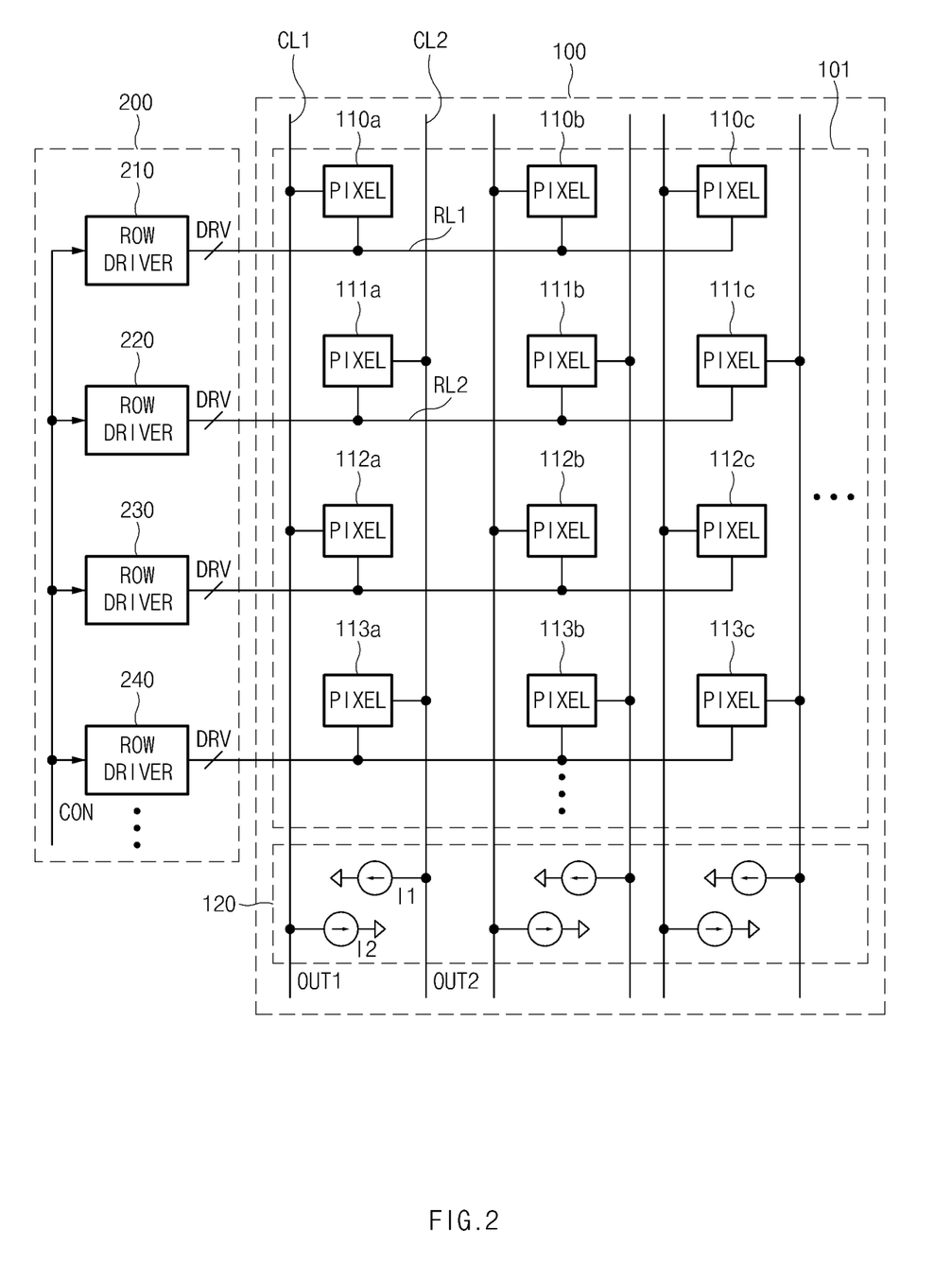
FIG. 2 is a schematic diagram illustrating a representation of an example of a pixel array and a row decoding circuit shown in FIG. 1 according to an embodiment of the disclosed technology.

FIG. 2 is a schematic diagram illustrating the pixel array 100 and the row decoding circuit 200 shown in FIG. 1.

Referring to FIG. 2, the pixel array 100 may include a pixel circuit 101 that includes pixels arranged in rows and columns and a biasing circuit 120 coupled to the pixel circuit 101. The row decoding circuit 200 is coupled to the pixel circuit 101 and includes row drivers 210, 220, 230, 240, . . . that are respectively coupled to pixels in different rows in the pixel circuit 101.

The pixel circuit 101 may include a plurality of pixels 110a to 113a, 110b to 113b, and 110c to 113c arranged in a row direction based on row lines RL1, RL2, . . . and in column direction based on pairs of column lines CL1 and CRL2 coupled to the different columns of pixels, respectively. Upon receiving an incident light, each of the pixels 110a to 113a, 110b to 113b, and 110c to 113c may output pixel signals OUT1 and OUT2 at a corresponding pair of column lines CL1 and CL2.

The respective pixels 110a to 113a, 110b to 113b, and 110c to 113c may be coupled between row lines and column lines. For example, two column lines CL1 and CL2 may be arranged at both sides of each column of the pixels such as pixels 110a to 113a contained in a first column in FIG. 2. The first pixel 110a of the first column may be coupled to a row line RL1 and a left column line CL1. The second pixel 111a of the first column may be coupled to a row line RL2 and a right column line CL2.

In each column coupled to a pair of column lines CL1 and CL2, pixels 110a and 112a arranged at odd row positions (i.e., odd numbered rows) in one column may be coupled to the left column line CL1, and pixels 111a and 1113a arranged at even row positions (i.e., even numbered rows) in one column may be coupled to the right column line CL2.

The biasing circuit 120 may be coupled to pairs of column lines CL1 and CL2 for the different columns to supply a drive current to each of the pixels 110a to 113a, 110b to 113b, and 110c to 113c via one of the pair of column lines CL1 and CL2 in each column. In the illustrated example in FIG. 2, the biasing circuit 120 may include a plurality of pairs of current sources I1 and I2 for different columns with each pair being coupled to a corresponding pair of column lines CL1 and CL2 of a corresponding column. The current sources I1 and I2 may generate a constant current acting as a reference current, such that the current sources I1 and I2 may operate as current sources of the respective pixels 110a to 113a, 110b to 113b, and 110c to 113c.

Although the embodiment of the present disclosure has exemplarily disclosed that the biasing circuit 120 includes current sources I1 and I2 for convenience of description, it should be noted that the biasing circuit 120 may further include a resistive element, for example, a resistor, a variable resistor, or the like.

The current sources of the biasing circuit 120 may be arranged such that only one current source is coupled to one column line. Thus, the current source I2 may be coupled to the column line CL1, and the current source I1 may be coupled to the column line CL2. In other words, the pixels 110a and 112a, which are coupled to the odd numbered rows, may share the current source I2, and the pixels 111a and 113a, which are coupled to the even numbered rows, may share the current source I1.

Although the embodiment of the disclosed technology has exemplarily disclosed that only one current source is coupled to only one column line for convenience of description, if many column lines are used, the column lines may be grouped into at least two column groups or at least three column groups, and only one common current source may be allocated to each column group.

Each row driver in the row decoding circuit 200 may generate a drive signal DRV to control the respective pixels in a corresponding row in the pixel array 100. In this case, the drive signal DRV may include a reset signal RX, a transmission signal TX, and a selection signal SX for controlling each pixel in a corresponding row.

The row drivers 210 to 240 in the row decoding circuit 200 may be driven by the control signal CON to supply the respective drive signals DRV to the different rows of pixels such as the row of pixels 110a, 110b, 110c, . . . , the row of pixels 111a, 111b, 111c, . . . , the row of pixels 112a, 112b, 112c, . . . and so on through row lines of the pixel array 100.

The plurality of row drivers 210 to 240 may be selectively activated by the control signal CON. The plurality of row drivers 210 to 240 may be coupled the plurality of row lines, respectively, and upon receiving a control signal CON, the pixels coupled to a corresponding row line activated by the control signal CON can be selected. In other words, the row drivers 210~240 may select the pixels by using the respective row lines and control operations of the selected pixels.

In some implementations, one pair of row drivers adjacent to each other may be simultaneously activated among the plurality of row drivers 210 to 240. For example, if two different row drivers 210 and 220 are simultaneously activated, the first row line RL1 and the second row line RL2 may be selected. In this implementation, the first column line CL1 and the second column line CL2 may be simultaneously activated. Thus, the first pixel 110a and the second pixel 111a, which are located adjacent to each other and between the first column line CL1 and the second column line CL2, may be activated. If two different row drivers 230 and 240 are simultaneously selected, the third pixel 112a and the fourth pixel 113a, which are located adjacent to each other and between the first column line CL1 and the second column line CL2, may be activated.

Thus, if the row drivers 210 and 220 located adjacent to each other are simultaneously activated, the pixel 110a coupled with the column line CL1 and the odd numbered row line RL1 and the pixel 111a coupled to the column line CL2 and even numbered row line RL2 may be selected.

As described above, in some implementations of the disclosed technology, two row drivers (e.g., 210 and 220) adjacent to each other may be simultaneously driven to activate one pair of pixels 110a and 111a that are coupled to the adjacent row lines activated by the two row drivers 210 and 220. The pixel 110a driven by the row driver 210 may generate the pixel signal OUT1 including a pixel noise. The pixel 111a driven by the other row driver 220 may generate the pixel signal OUT2 including a pixel noise. The pixel 111a driven by the other row driver 220 may have the same structure as the pixel 110a. Therefore, the pixel signals OUT1 and OUT2 generated from the single pair of two pixels 110a and 111a may have the same noise components. The same noise components of the pixel signals OUT1 and OUT2, which are transferred to the ADC circuit 400 from the pixel array 100, can be canceled or removed by using common mode rejection ratio (CMRR) characteristics employed in a correlated double sampling (CDS) circuit in the ADC circuit 400.

Figure 3:
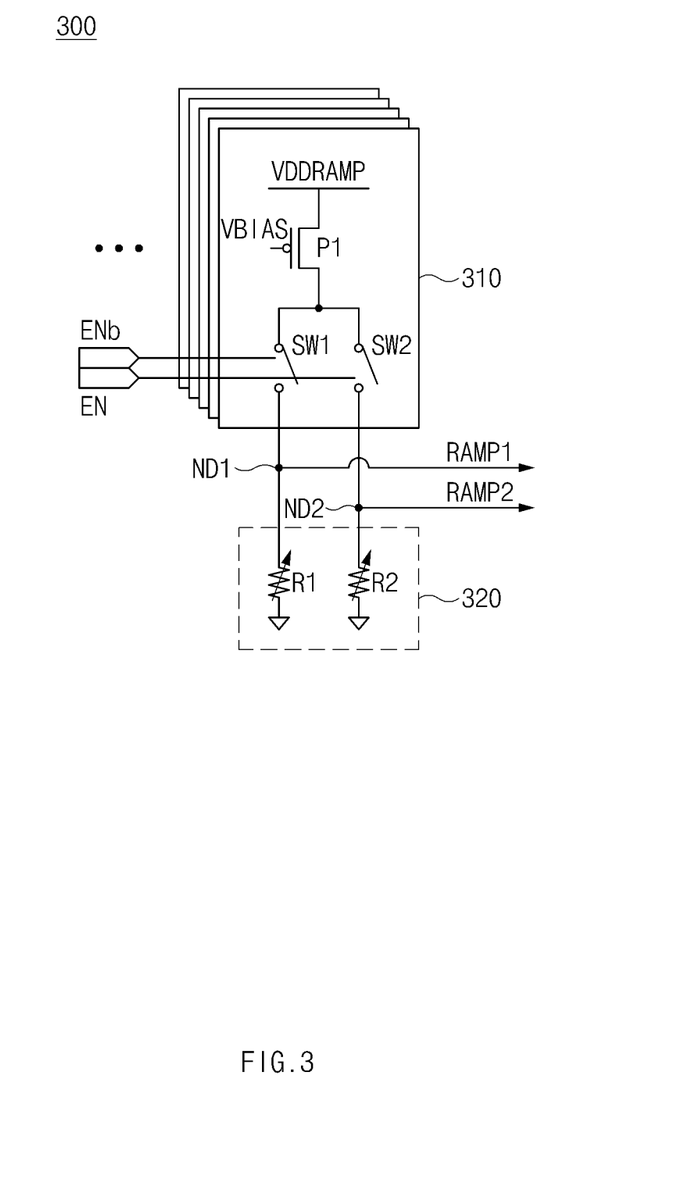
FIG. 3 is a detailed circuit diagram illustrating a representation of an example of a ramp generator shown in FIG. 1 according to an embodiment of the disclosed technology.

FIG. 3 is a detailed circuit diagram illustrating an example of the ramp generator 300 shown in FIG. 1.

Referring to FIG. 3, the ramp generator 300 may include a plurality of current digital-to-analog conversion (DAC) cells 310 and a resistor circuit 320 where each DAC cell is coupled to a corresponding resistor circuit 320. In this case, the current DAC cell 310 may generate ramp signals RAMP1 and RAMP2 in response to a bias voltage VBIAS.

The current DAC cell 310 may include a transistor P1 and switches SW1 and SW2. The transistor P1 may selectively provide a power-supply voltage VDDRAMP in response to the bias voltage VBIAS. In this case, the transistor P1 may operate as a variable current source to regulate a micro current that is supplied to the switches SW1 and SW2 in response to the bias voltage VBIAS.

The switches SW1 and SW2 may be commonly coupled to the transistor P1 and may operate by enable signals EN and ENb in a complementary manner. In this case, the enable signal EN may have a phase opposite to that of the other enable signal ENb, and the enable signals EN and ENb may be contained in the control signal CON received from the controller 600.

The plurality of current DAC cells 310 may generate ramp signals RAMP1 and RAMP2 by adjusting the number of switches SW1 and SW2 (e.g., transistors) coupled to the enable signals EN and ENb. In this case, a voltage level of the ramp signal RAMP1 may periodically increase according to lapse of time, and a voltage level of the other ramp signal RAMP2 may periodically decrease according to lapse of time.

In addition, the resistor circuit 320 may control load of the ramp signals RAMP1 and RAMP2 generated from the current DAC cell 310, and may output the controlled ramp signals RAMP1 and RAMP2. The resistor circuit 320 may include variable resistors R1 and R2. The variable resistor R1 may be coupled between a switch SW1 and a ground terminal, and may thus output the ramp signal RAMP1. The variable resistor R2 may be coupled between a switch SW2 and a ground terminal, and may thus output the ramp signal RAMP2.

The ramp generator 300 according to the embodiment may be driven by a differential operation of the current DAC cell 310, such that one pair of the ramp signals RAMP1 and RAMP2 applied to the output nodes ND1 and ND2 may have the same noise components. In other words, since two ramp signals RAMP1 and RAMP2 are generated using a same ramp generator 300, the two ramp signals RAMP1 and RAMP2 may have the same noise components. Therefore, the ramp signals RAMP1 and RAMP2 having the same noise components may be applied to a column circuitry in the downstream ADC circuit 400 (such as a correlated double sampling (CDS) circuit 410 in the ADC circuit 400), such that noise generated from the ramp generator 300 may be cancelled or removed according to common mode rejection ratio (CMRR) characteristics employed in a correlated double sampling (CDS) circuit 410 in a column in the ADC circuit 400.

Figure 4:
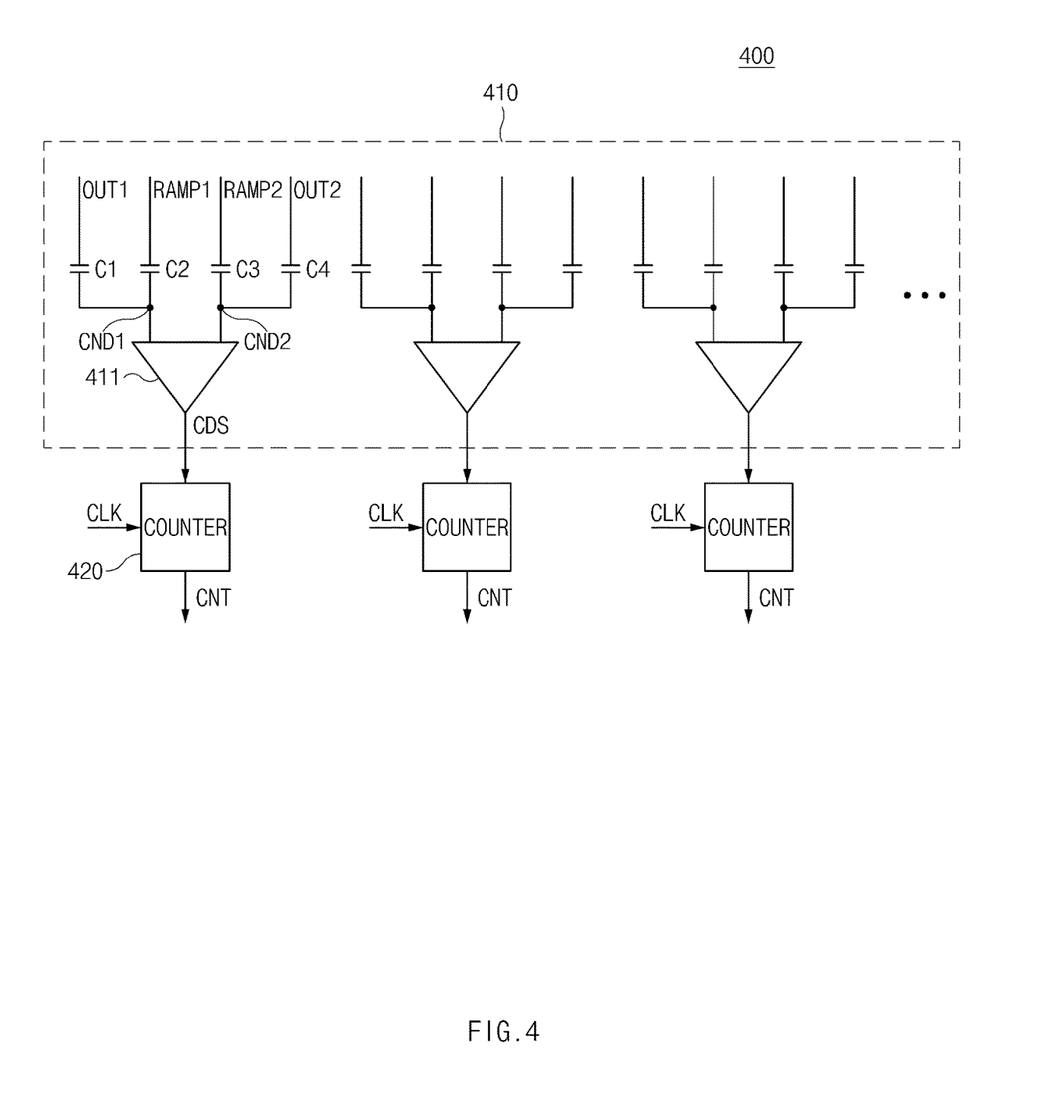
FIG. 4 is a detailed circuit diagram illustrating a representation of an example of an ADC circuit shown in FIG. 1.

FIG. 4 is a detailed circuit diagram illustrating an example of the ADC circuit 400 shown in FIG. 1.

Referring to FIG. 4, the ADC circuit 400 may include an array of columns with each column including a correlated double sampling (CDS) circuit 410 and a column counter 420.

In each column in the ADC circuit 400, the CDS circuit 410 may generate a CDS-sampling signal (CDS) in response to the pixel signals OUT1 and OUT2 received from the pixel array 100 and the ramp signals RAMP1 and RAMP2 received from the ramp generator 300. In order to cancel or remove an offset value of each pixel, the CMOS image sensor may compare a pixel signal obtained before light is incident on a corresponding pixel (i.e., a reset signal) with a pixel signal obtained after light is incident on the corresponding pixel (i.e., an image signal). By doing so, the CMOS image sensor can obtain a pixel signal for each pixel, which is caused by actual incident light without influence from others, for example, the offset value of each pixel. The above-mentioned scheme will hereinafter be referred to as Correlated Double Sampling (CDS). For the ADC (Analog-to-Digital Conversion) operation on the pixel signals OUT1 and OUT2, the CDS circuit 410 may use the ramp signals RAMP1 and RAMP2 that sequentially decrease in a high-to-low (HL) direction and sequentially increase in a low-to-high (LH) direction.

The CDS circuit 410 may include a plurality of capacitors C1 to C4 and a plurality of comparators 411. The capacitors C1 to C4 may be included in an input stage of the ADC circuit 400, and may reduce a noise band of random noises received from the ramp generator 300. The capacitors C1 to C4 may be used to transmit only the amount of voltage change, irrespective of a direct current (DC) level of an input signal.

One pair of capacitors C1 and C4 from among the plurality of capacitors C1 to C4 may receive the pixel signals OUT1 and OUT2 from the pixel array 100. The remaining one pair of capacitors C2 and C3 from among the plurality of capacitors C1 to C4 may receive the ramp signals RAMP1 and RAMP2 from the ramp generator 300. Thus, the capacitors C1 to C4 may be coupled to the pixel signals OUT1 and OUT2 and the ramp signals RAMP1 and RAMP2 on a one to one basis. One end of each of the capacitors C1 and C2 may be commonly coupled to a node CND1, and one end of each of the capacitors C3 and C4 may be commonly coupled to a node CND2.

The comparator 411 may receive pixel signals OUT1 and OUT2 from the column lines CL1 and CL2 through capacitors C1 and C4. The comparator 411 may be allocated to each of the column lines CL1 and CL2. The comparator 411 may receive the ramp signals RAMP1 and RAMP2 from the output nodes ND1 and ND2 of the ramp generator 300 through the capacitors C2 and C3. That is, each capacitor 411 contained in the ADC circuit 400 may receive the ramp signals RAMP1 and RAMP2. As discussed above, the two ramp signals RAMP1 and RAMP2 are generated using a same ramp generator 300 and thus, the two ramp signals RAMP1 and RAMP2 may have the same noise components. In addition, the pixel signals OUT1 and OUT2 generated from the two pixels 110a and 111a may have the same noise components, since the two pixels 110a and 111a are coupled to the adjacent row lines activated by the two row drivers 210 and 220. Thus, the comparator 411 may receive input signals having the same noise components.

The ADC circuit 400 according to the embodiment may suppress noise power of a specific frequency or greater by a plurality of capacitors C1 to C4 contained in an input stage of the CDS circuit 410. For example, the pair of capacitors C1 and C4 may transmit the same pixel noise components to the comparator 411, and noise components of the pixel signals OUT1 and OUT2 may be cancelled or removed by the CDS circuit which cancels or removes offset values of each pixel. The pair of capacitors C2 and C3 may transmit the same ramp noise components to the comparator 411, and noise components may be cancelled or removed by the CDS circuit which cancels or removes offset values of each pixel.

Each counter 420 may count a clock signal CLK received from the controller 600 in response to a sampling signal CDS from the comparator 411. In some implementations, the counter 420 may count a difference value (sampling signal CDS) between the reset signal and the image signal sampled by the correlated double sampling (CDS) scheme, and may output the counted result as a digital signal. For example, the counter 420 may perform a first counting operation in response to the reset signal, and may perform a second counting operation in a data conversion period. The counters 420 may be coupled to the comparators 411 on a one to one basis. A counting value of each counter 420 may be initialized under control of the controller 600.

Figure 5:
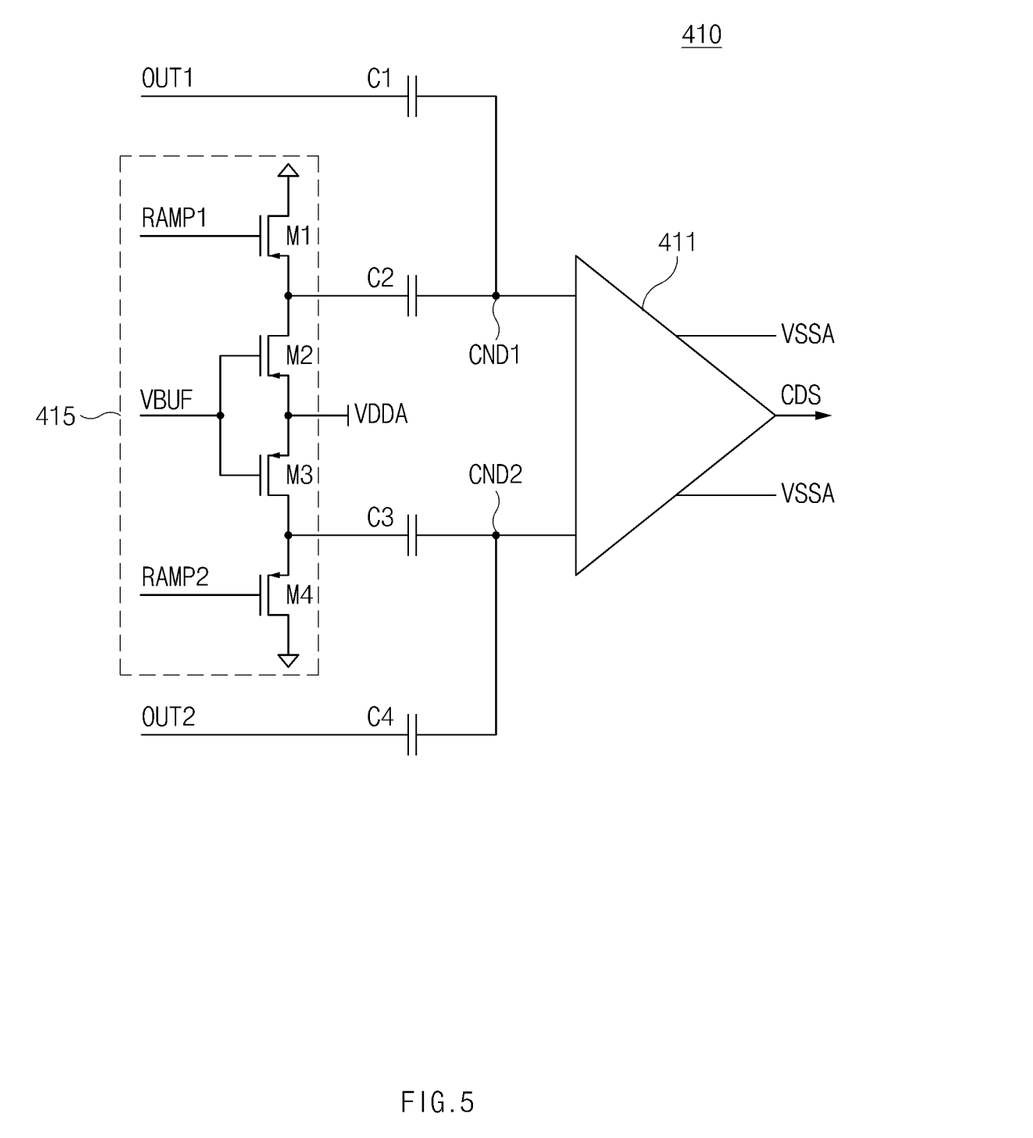
FIG. 5 is a circuit diagram illustrating a representation of another example of an ADC circuit shown in FIG. 1.

FIG. 5 is a circuit diagram illustrating a representation of another example of an ADC circuit 400 shown in FIG. 1 for implementing one column of the ADC circuit 400.

Referring to FIG. 5, the ADC circuit 400 may include an additional buffer circuit 415 in each column that is not included in the implementation in FIG. 4.

The buffer circuit 415 for each column in the ADC circuit 400 may reduce load applied to input terminals of the capacitors C2 and C3 by buffering ramp signals RAMP1 and RAMP2 according to a buffer control signal VBUF.

The buffer circuit 415 may include a plurality of transistors M1 to M4 coupled in series to a ground voltage (VSSA) input terminal. In this case, the transistor M1 may be coupled between the capacitor C2 and the ground voltage (VSSA) input terminal, such that the transistor M1 may receive the ramp signal RAMP1 through a gate terminal thereof. The transistor M4 may be coupled between the capacitor C3 and the ground voltage (VSSA) input terminal, and may receive the ramp signal RAMP2 through a gate terminal thereof.

The transistors M2 and M3 may receive a buffer signal VBUF through a common gate terminal, and may receive a power-supply voltage (VDDA) through a common drain terminal. The transistors M2 and M3 may supply a constant current to capacitors C2 and C3 in response to the buffer signal VBUF. In this case, the ground voltage VSSA and the power-supply voltage VDDA used in the buffer circuit 415 may have the same voltage level as a power source used in the comparator 411.

Figure 6:
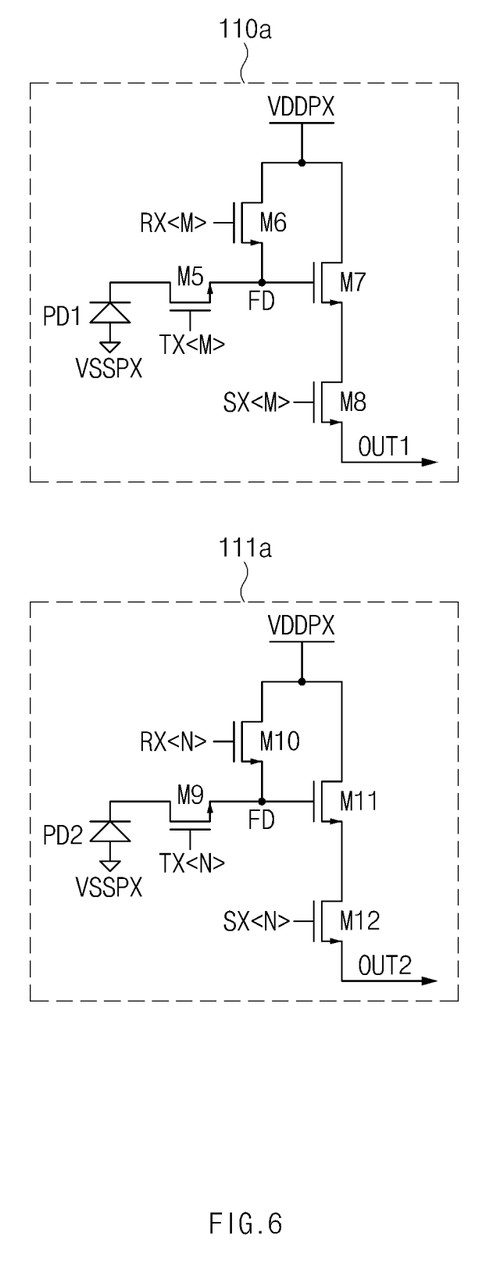
FIG. 6 is a detailed circuit diagram illustrating a representation of an example of a unit pixel shown in FIG. 1.

FIG. 6 is a detailed circuit diagram illustrating an example of a unit pixel in the pixel array 100 shown in FIG. 1.

The embodiment of FIG. 6 may be applied to the plurality of pixels 110a to 113a, 110b to 113b, and 110c to 113c, which are shown in FIG. 2. In the below, exemplary explanations will be provided with reference to the single pair of pixels 110a and 111a.

The pixel 110a may include a photosensitive device PD1, a transmission transistor M5, a reset transistor M6, a drive transistor M7, and a selection transistor M8.

The photosensitive device PD1 may perform a photoelectric conversion function. The photosensitive device PD1 may be coupled between the ground voltage terminal VSSPX and the transmission transistor M5. The photosensitive device PD1 may receive light from an external part, and may generate photocharges based on the received light. When the photosensitive device PD1 is turned on, the photosensitive device PD1 may detect incident light and may generate photocharges. On the other hand, when the photosensitive device PD1 is turned off, the photosensitive device PD1 may not detect incident light. The photosensitive device PD1 may be implemented using at least one of a photodiode, a phototransistor, a photogate, or a pinned photodiode, and a combination thereof.

In response to a transmission signal TX applied to a gate terminal of the transmission transistor M5, the transmission transistor M5 may transmit photocharges of the photosensitive device PD1 to a floating diffusion node FD. In this case, the floating diffusion node FD may be or include a diffusion region that is commonly coupled to one terminal of the transmission transistor M5 and one terminal of the reset transistor M6. In the floating diffusion node FD, charges may be stored, which correspond to the image signal or an initialization voltage VDDPX.

The reset transistor M6 may transmit the power-supply voltage VDDPX to the floating diffusion node FD in response to the reset signal RX applied to the gate terminal thereof. Thus, the reset transistor M6 may reset photocharges stored in the floating diffusion node FD in response to the reset signal RX. In this case, the power-supply voltage VDDPX applied to a drain terminal of the reset transistor M6 may be the initialization voltage for resetting photocharges stored in the floating diffusion node FD.

The drive transistor M7 may be coupled between the selection transistor M8 and the power-supply voltage (VDDPX) input terminal, and a gate terminal thereof may be coupled to the floating diffusion node FD. The drive transistor M7 may generate an electric signal corresponding to charges stored in the floating diffusion node FD, and may transmit the generated electric signal to the selection transistor M8. In this case, the drive transistor M7 may act as a source follower buffer amplifier.

The selection transistor M8 may be coupled between the drive transistor M7 and a pixel signal (OUT1) output terminal, and may receive the selection signal SX through a gate terminal thereof. The selection transistor M8 may output an electric signal received from the drive transistor M7 as the pixel signal OUT1 in response to the selection signal SX.

A pixel 111a located adjacent to the pixel 110a may include a photosensitive device PD2, a transmission transistor M9, a reset transistor M10, a drive transistor M11, and a selection transistor M12. The pixel 111a may output the pixel signal OUT2 through an output node. The pixel 111a is identical in structure to the other pixel 110a, and as such a detailed description thereof will herein be omitted.

In FIG. 6, the signals, TX<M>, RX<M>, and SX<M>, are indicated with '<M>' on the assumption that the pixel 110a is arranged in an M-th row in the pixel array 100 and the signals are indicated with '<N>' on the assumption that the pixel 111a is arranged in an N-th row line in the pixel array 100.

The pixel 111a and the pixel 110a are identical in structure to each other, such that the pixel signals OUT1 and OUT2 have the same noise components. To make the two adjacent pixels 110a and 11a have the same noises components, the two pixels 111a and 110a are simultaneously driven by the two adjacent row drivers. In some implementations, the noise of the pixel 110a is copied by the pixel 111a to Accordingly, noise components applied to input terminals of the comparator 411 are matched to each other, such that the noise components encountered in an active sampling operation of the CDS circuit 410 can be cancelled or removed.

Figure 7:
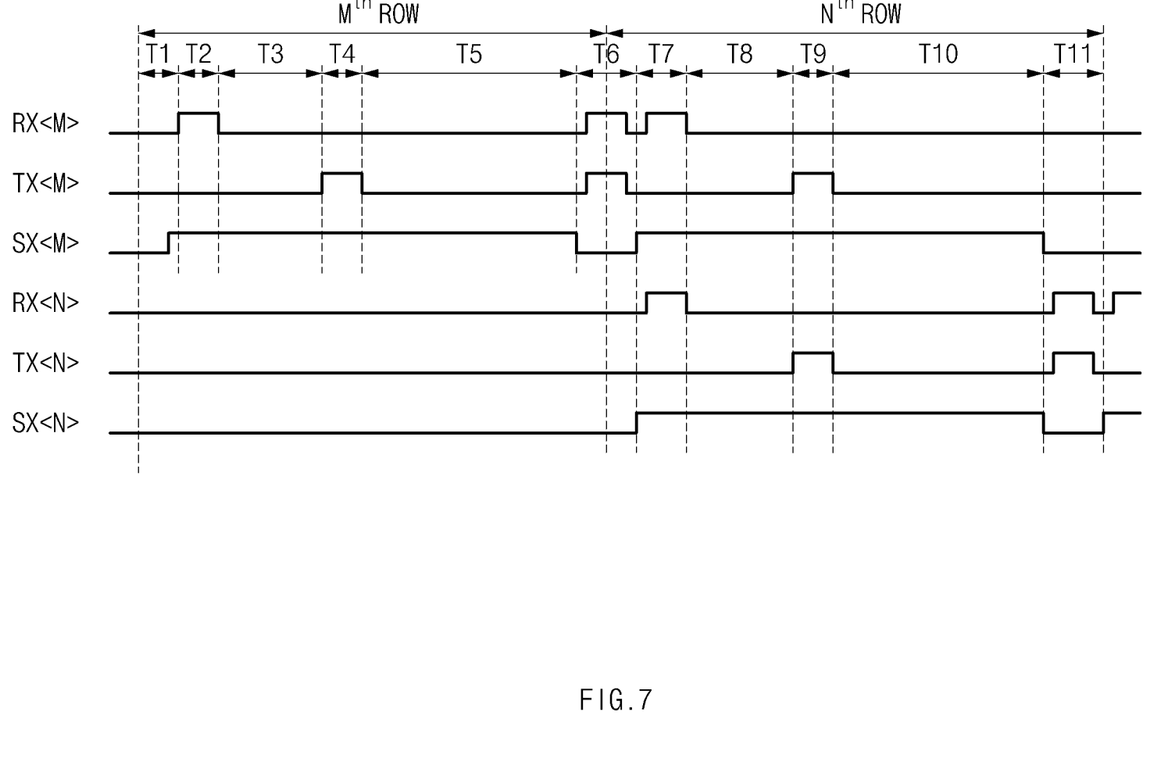
FIG. 7 is a timing diagram illustrating a representation of an example of operations of the unit pixel shown in FIG. 6.

FIG. 7 is a timing diagram illustrating operations of the unit pixel shown in FIG. 6.

Referring to FIG. 7, in a line selection period T1, the row decoding circuit 200 may select a corresponding line (e.g., an M-th row line of the pixel array 100). Thus, if the selection signal SX<M> is activated, the selection transistor M8 is turned on.

In a reset period T2, if a reset signal RX<M> is activated, a voltage of the floating diffusion node FD may be reset by the reset transistor M6. A voltage of the floating diffusion node FD may be set to a reset voltage value, and the reset voltage may be reduced by a threshold voltage of the drive transistor M7, such that the resultant voltage may be output as the pixel signal OUT1 through a source follower.

Thereafter, in a code conversion period T3, the reset signal RX<M> is deactivated and the selection signal SX<M> is activated. Since the reset signal RX<M> is deactivated, the reset transistor M6 may be turned off. As a result, in the code conversion period T3, the reset output voltage of the pixel 110a may be ADC-processed through the ADC circuit 400.

Subsequently, in a reception (Rx) data transmission period T4, if the transmission signal TX<M> is activated, the transmission transistor M5 may be turned on. Therefore, the value stored in the photosensitive device PD1 may be transferred to the floating diffusion node FD and thus, a value of the floating diffusion node FD become to change. The changed value of the floating diffusion node FD may be transferred to the pixel signal OUT1 through the drive transistor M7.

Subsequently, in a data code conversion period T5, if the transmission signal TX<M> is deactivated, the transmission transistor M5 may be turned off. As a result, in the data code conversion period T5, a data code of the pixel signal OUT1 may be converted through the ADC circuit 400.

Time periods T1 to T5 in which the M-th row line is selected and the selection signal SX<M> is thus activated may correspond to a first operation period. In the first operation period including T1 to T5, only one pixel 110a may be selected and data conversion of the selected pixel 110a may be carried out.

Subsequently, if the selection signal SX<M> is deactivated in an initialization period T6, the selection transistor M8 is turned off such that data conversion of the pixel 110a may be completed. In a time period T6, the transmission signal TX<M> and the reset signal RX<M> may be re-activated. As a result, the transmission transistor M5 and the reset transistor M6 are turned on, such that the floating diffusion node FD may be re-initialized. Thus, charges left in the photosensitive device PD1 of the pixel 110a, data conversion of which is completed, may be emptied again.

Thereafter, in noise cancellation periods T7 to T10, two adjacent pixels 110a and 111a are simultaneously activated to cancel or remove noise components of the pixel signals. In this case, the pixel 111a driven by an N-th row line may correspond to an active pixel. The active pixel is utilized to capture an image projected onto the pixel array 100, for example, by sensing and converting light into a pixel signal. The pixel 110a, which has already operated in a previous time period by driving an M-th row line, may be activated to provide the same noise condition as in the pixel 111a. The pixel 110a may be distinguished from the active pixel in terms of the operations as not sensing and converting light into the electrical signals.

The time periods T7 to T10 in which the selection signals SX<M> and SX<N> are activated by selection of both the M-th row line and the N-th row line may correspond to a second operation period. In time periods T7 to T10, one pair of pixels 110a and 111a may be selected such that a data conversion process and noise cancellation can be carried out.

As a result, in a reset time period T7, one pair of lines (e.g., M-th and N-th row lines of the pixel array 100) may be selected by the row decoding circuit 200. If the selection signals SX<M> and SX<N> are activated, the selection transistors M8 and M12 may be turned on.

In the time period T7, if the reset signals RX<M> and RX<N> are activated, a voltage of the floating diffusion node FD may be reset by the reset transistors M6 and M10. In this case, since the voltage of the floating diffusion node FD of the pixel 110a has already been reset in the previous time period T2, the voltage of the floating diffusion node FD may be in a blank state.

The voltage of the floating diffusion node FD of the pixel 111a may be set to the reset voltage, and the reset voltage may be reduced by a threshold voltage of the drive transistor M11, such that the resultant signal may be output as the pixel signal OUT2 through a source follower.

Subsequently, if the reset signal RX<N> is deactivated in a code conversion period T8, the reset transistor M10 may be turned off. Thus, in the code conversion period T8, the reset output voltage of the pixel 111a may be ADC-processed through the ADC circuit 400.

Thereafter, in a reception data transmission period T9, if the transmission signals TX<M> and TX<N> are activated, the transmission transistors M5 and M8 may be turned on. As a result, the value stored in the photosensitive device PD2 may be transferred to the floating diffusion node FD and thus, a value of the floating diffusion node FD become to change. The changed value of the floating diffusion node FD may be transferred to the pixel signal OUT2 through the drive transistor M11.

In this case, since the pixel 110a operates not sensing and converting light into the electrical signal differently from the pixel 111a, the floating diffusion node FD of the pixel 110a doesn't store any photocharges and is empty. Thus, the pixel 110a may transmit only the noise component using a signal having a black level, instead of transmitting data. In other words, whereas the pixel signal OUT2 has both pixel data and the noise component, the pixel signal OUT1 may have only the noise component. That is, although two pixels 110a and 111a are simultaneously operated, the pixel 110a, data conversion of which is completed, from among the two pixels 110a and 111a is not charged with light (i.e., the pixel 110a may have black data), such that the pixel 110a may not output substantial data. Accordingly, the embodiment of the disclosed technology can simultaneously drive the pixel 111a and the other pixel 110a adjacent to the pixel 111a during the CDS operation of the pixel 111a, such that noises generated from the two pixels 110a and 111a may be offset against each other.

Subsequently, if the transmission signals TX<M> and TX<N> are deactivated in the data code conversion period T10, the transmission transistors M5 and M9 may be turned off. As a result, in the time period T10, data code conversion of the pixel signal OUT2 may be carried out by the ADC circuit 400.

Thereafter, in an initialization period T11, if the selection signals SX<M> and SX<N> are deactivated, the selection transistors M8 and M12 are turned off, such that data conversion of the pixel 111a may be completed. In a time period T11, the transmission signal T TX<N> and the reset signal RX<N> may be re-activated. As a result, the transmission transistor M9 and the reset transistor M10 are turned on, such that the floating diffusion node FD may be re-initialized.

As is apparent from the above description, the ADC circuit and a CMOS image sensor (CIS) including the same according to the embodiments of the present disclosure may efficiently remove (or cancel) noise generated by conversion of pixel data.

Those skilled in the art will appreciate that the embodiments may be carried out in other ways than those set forth herein. The above embodiments are therefore to be construed in all aspects as illustrative and not restrictive.

Although a number of illustrative embodiments have been described, it should be understood that numerous other modifications and embodiments can be devised by those skilled in the art that will fall within the scope of the disclosed technology. Particularly, numerous variations and modifications are possible in the component parts and/or arrangements which are within the scope of the disclosed technology. In addition to variations and modifications in the component parts and/or arrangements, alternative uses will also be apparent to those skilled in the art.

What is claimed is:

1. A complementary metal oxide semiconductor (CMOS) image sensor comprising:
    a pixel array provided with a plurality of pixels arranged in row and column directions, and configured to output a plurality of pixel signals corresponding to incident light;
    a row decoding circuit configured to generate a drive signal for driving the pixel array;
    a ramp generator configured to generate a single pair of ramp signals; and
    an analog-to-digital conversion (ADC) circuit configured to convert the plurality of pixel signals into digital signals in response to the single pair of ramp signals,
    wherein the row decoding circuit selects any one of the plurality of pixels in a first operation period, and selects one pair of pixels adjacent to each other from among the plurality of pixels in a second operation period,
    wherein the pixel array includes:
    pixels that are among the plurality of pixels and arranged in a first column;
    a first column line disposed at a left side of the pixels arranged in the first column and configured to output a first pixel signal; and
    a second column line disposed at a right side of the pixels arranged in the first column and configured to output a second pixel signal,
    wherein two adjacent pixels in the first column are coupled to the first column line and the second column line, respectively
    wherein:
    in the first operation period, data conversion of the first pixel signal is carried out; and
    in the second operation period, transmission of black data is performed by completion of the data conversion of the first pixel signal, and data conversion of the second pixel signal is performed.

2. The CMOS image sensor according to claim 1, wherein:
    a first pixel of the first column is coupled to a first row line and the first column line; and
    a second pixel of the first column is coupled to a second row line and the second column line.

3. The CMOS image sensor according to claim 1, wherein:
    in the first operation period, the row decoding circuit selects a first pixel using a first selection signal; and
    in the second operation period, the row decoding circuit selects the first pixel and a second pixel using the first selection signal and a second selection signal, and sequentially activates a reset signal and a transmission signal about the one pair of the pixels adjacent to each other.

4. The CMOS image sensor according to claim 1, wherein the analog-to-digital conversion (ADC) circuit includes:
    a correlated double sampling (CDS) circuit configured to generate a sampling signal by performing a correlated double sampling (CDS) operation in response to the plurality of pixel signals and the one pair of ramp signals; and
    a plurality of counters configured to count one or more clock signals in response to the sampling signal.

5. The CMOS image sensor according to claim 1, wherein the analog-to-digital conversion (ADC) circuit further includes:
    a buffer circuit configured to buffer the one pair of ramp signals in response to a buffer control signal.

6. The CMOS image sensor according to claim 1, wherein the plurality of pixels have the same pixel structure.

7. The CMOS image sensor according to claim 1, wherein the row decoding circuit comprising:
    a first row driver configured to generate a drive signal for driving the first pixel; and
    a second row driver configured to generate a drive signal for driving the second pixel, and located adjacent to the first row driver.

8. The CMOS image sensor according to claim 1, wherein a gap time period is disposed between the first operation period and the second operation period, such that a selection signal about the first pixel is deactivated in the gap time period, and a reset signal and a transmission signal are activated for a predetermined time in the gap time period.

9. The CMOS image sensor according to claim 1, wherein the ramp generator includes:
    a current digital-to-analog conversion (DAC) cell configured to generate a first ramp signal and a second ramp signal in response to a bias voltage; and
    a resistor circuit configured to control load of the first ramp signal and the second ramp signal.

10. The CMOS image sensor according to claim 9, wherein the current digital-to-analog conversion (DAC) cell is configured to adjust a number of switches to be connected in response to an enable signal, and generate the first ramp signal having a voltage level that periodically increases and the second ramp signal having a voltage level that periodically decreases.

* * * * *